March 31, 1959      L. A. PALEY      2,879,982
APPARATUS FOR TREATING CEMENT SLURRY
Filed Dec. 16, 1955
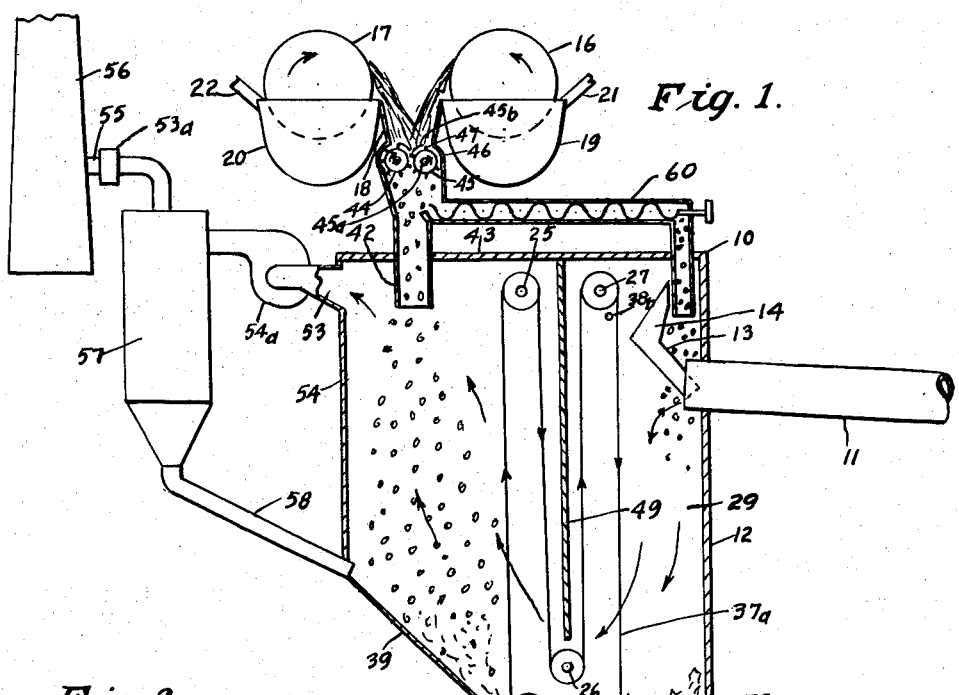
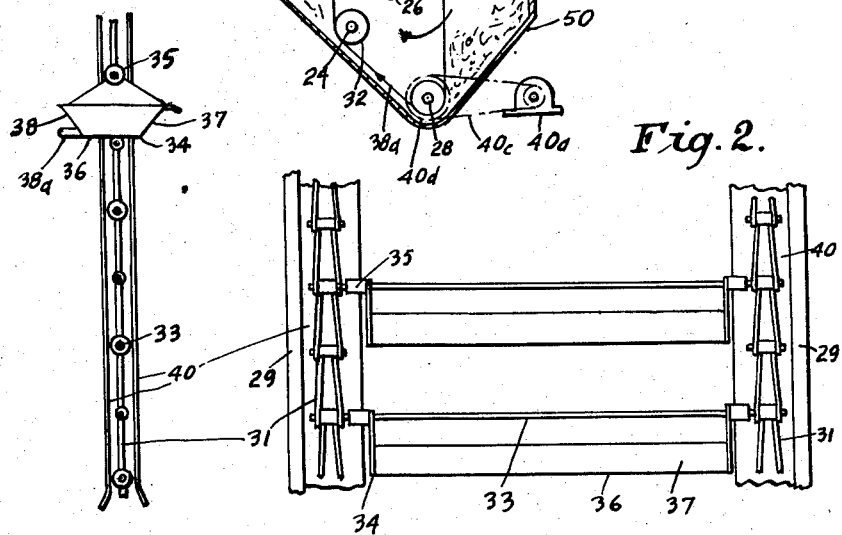
INVENTOR.
Lewis A. Paley United States Patent Office 2,879,982
Patented Mar. 31, 1959

2,879,982

APPARATUS FOR TREATING CEMENT SLURRY

Lewis A. Paley, Aurora, Ill.

Application December 16, 1955, Serial No. 553,525

7 Claims. (Cl. 263—32)

This invention relates to an apparatus for treating a wet pulp.

The invention further relates to an apparatus for drying and preheating a cement pulp or other wet material, and simultaneously precipitating dust from the kiln gases used for the drying and preheating operation.

In the manufacture of Portland cement, a dry process or a wet process is used. In the wet process, a mill is required for grinding the raw materials, limestone and clay or shale, and water is introduced into the raw materials to a moisture content of 30 to 60%, which are thus ground in slurry form. The slurry is often classified by centrifugal action into fine and coarse materials to improve the grinding efficiency. The slurry is then often filtered on rotary filter wheels to reduce the moisture content of the slurry or pulp to about 16% and this wet pulp is introduced into the upper end of a rotary kiln inclined slightly to the horizontal. Powdered coal or other fuel, and air are introduced into the lower end of the kiln and a high temperature develops which fires the cement pulp and causes it to react and form cement clinker. This clinker is cooled and ground fine with about 4% gypsum retarder to form the Portland cement of commerce.

Due to the moisture content of the cement pulp and the fact that it is cold when put into the kiln, the fuel requirements are high per barrel of cement produced, usually over 1,000,000 B.t.u. per barrel of cement produced. A long rotary kiln is required to produce the cement clinker, generally from 450 to 475 feet long. With the dry process, the waste gases leave the kiln at a temperature of about 1800° F., and with the wet process 600° F. These waste gases leaving the kiln are difficult to treat by waste heat boilers to recover waste heat, because the gases are heavily laden with cement dust which fouls up the heat exchange surfaces and stop the action of the waste heat boiler. Expensive dust collection systems have been built to overcome this difficulty so that waste heat could be recovered and the cost of fuel per barrel of cement be reduced.

An object of this invention therefore, is to provide an apparatus for drying and preheating cement pulp and simultaneously precipitating dust from the kiln gases used in the drying and preheating operation.

Another object of the invention is to increase the capacity of existing kilns and cement manufacturing equipment.

Another object of the invention is to reduce the fuel requirements in B.t.u.'s per barrel of cement.

Another object of the invention is to reduce the length of rotary kilns required for the manufacture of cement.

A further object of the invention is to simply the cement manufacturing method and produce valuable by-products.

A still further object of the invention is to provide an apparatus suitable for carrying out the cement manufacturing method; also to improve cement manufacturing methods and apparatus in other respects hereinafter specified and claimed.

Reference is to be had to the accompanying drawing forming a part of this specification, in which—

Fig. 1 is a sectional elevation through the apparatus.

Fig. 2 is a fragmentary elevation showing a portion of the bucket conveyor chain, and Fig. 3 is a sectional elevation through the conveyor chain.

Referring to the drawings by numerals, a chamber 10 is preferably constructed of firebrick, or steel lined with firebrick. A rotary cement kiln 11 extends through one wall 12 of the chamber 10, said kiln being inclined slightly downwardly to the horizontal. If the apparatus is to be used for drying a material other than Portland cement pulp or slurry, the kiln 11 is replaced by a rotary dryer of similar nature but generally has no fire brick lining, as a kiln has. Dried and preheated cement slurry or pulp is introduced into the upper end of the kiln 11 by means of an inclined chute 13 having a hopper 14 at the upper end thereof. The pulp travels downwardly along the kiln 11 and is fired to form Portland cement clinker which is discharged to a cooler from the lower end of said kiln. Powdered coal and air are introduced into the lower end of the kiln 11 to provide the heat for firing the cement pulp. Hot waste gases at a temperature of about 1800° F. flow from the end of kiln 11 into the chamber 10.

Mounted above the chamber 10 are two or more filter wheels 16 and 17 which rotate about horizontal axes toward each other to discharge filtered cement pulp into a hopper 18 extending between said filter wheels. Each of the filter wheels rotate in a cement slurry tank 19 and 20 respectively, and the slurry is introduced into the tanks 19 and 20 by pipes 21 and 22 respectively. The moisture content of the slurry introduced into tanks 19 and 20 will range from about 33% to 40%, and the moisture content of the filtered cement pulp discharged into hopper 18 will usually range from 12 to 18%.

Mounted within the chamber 10 are a plurality of parallel bucket conveyor sprocket shafts 24 to 28 inclusive, which are rotatably mounted in suitable bearings (not shown) which are located outside the chamber 10 for protection against heat in the chamber 10. These shafts thus extend through the parallel walls 29 of the chamber 10. A pair of chain conveyors 31 pass around sprocket wheels 32 which are mounted in pairs on the shafts 24 to 28. Pivot rods 33 extend between the chains 31 at intervals and buckets 34 have end bearings 35 which pivotally support buckets 34 on said rods 33. The buckets 34 have a bottom 36 and inclined front wall 37 and rear wall 38. The bearings 35 are mounted well above the bucket bottom 36 so that the buckets always hang vertically from rods 33 under the action of gravity. Each bucket has a trip lug 38a which engages a stationary trip pin 38b which is positioned adjacent the shaft 27 so as to dump the bucket contents into hopper 14 during the downward movement of said buckets.

The shafts 24 to 28 are so positioned that the conveyor chain makes vertical flights 37a only, except for an inclined loading flight 38a where the buckets scrape along an inclined wall 39 of the chamber 10 for receiving a load of partly dried cement pulp and cement dust. No rollers are preferably used on the conveyor chain 31 because of the high temperature of the waste gases surrounding the chain. I use spaced vertical guides 40 adjacent the chain 31 to limit the lateral movement of said chains.

The shaft 28 is rotated by a gear motor 40a connected by a chain 40c to a sprocket 40d on shaft 28. Shaft 26 is preferably provided with spring take up bearings (not shown) to allow for change in length of the chains due to temperature changes.

In view of the high temperature of the waste gases (1800° F.), I prefer to make all metal parts, such as chains, buckets, sprockets and shafts of a special alloy having the following composition:

| | Percent |
|---|---|
| Chromium | 18 |
| Nickel | 8 |
| Silicon | 3 |
| Carbon | 0.12 |
| Iron | Balance |

This alloy is reported to have a tensile strength of 24,000 lbs./in.$^2$ at 1700° F.

A rectangular chute 42 extends from the hopper 18 through the top wall 43 of chamber 10 to discharge filtered, cement pulp into the upper part of the chamber 10. Opposed parallel driven rollers 44 and 45 are positioned above the chute 42 in arcuate casings 46, said rollers having longitudinal flutes 47 which intermesh to break up the cement pulp in hopper 18 into pieces of substantially uniform size to be dropped through chute 42 into the chamber 10. Each roller shaft 45a has a spur gear 45b, said spur gears meshing to drive said rollers 44 and 45 at the same speed but in opposite directions. One of the shafts 45a is connected to a driving motor (not shown).

A baffle 49 extends from the top chamber wall 43 between vertical flights of the conveyor chains 31 to a point near the shaft 26 so as to direct the waste gases entering chamber 10 from kiln 11 in a tortuous path around the buckets 34 in a general direction counter-current to the movement of said buckets. The waste gases leave the chamber 10 through an exit pipe 53 in the top of rear chamber wall 54, and a centrifugal blower 54a is connected to draw said gases from said chamber 10. A motor (not shown) is connected to the blower 54a to drive same. Near the rear wall 54, the movement of the hot gases is upward, and they meet a downwardly falling shower of wet cement pulp from the rollers 44 and 45 to rapidly dry said pulp with almost explosive violence. The shower of wet pulp also serves to scrub or precipitate out cement dust from the waste gases so that a mixture of partly dried pulp and cement dust falls onto the inclined chamber wall 39 to be picked up by the buckets which move the mixture through a tortuous path for further drying and preheating by the hot gases. Some dust also precipitates on the hot side of baffle 49 due to the reduced velocity of the gases and falls to an inclined chamber floor 50 to be picked up by the buckets. The dust may be considerable and on many kilns may amount to 20 tons per hour.

During the travel of the buckets on the hot side of baffle 49, the cement pulp and dust mix is preheated by the hot gases to 1000°–1500° F. which greatly increases the capacity of the rotary kiln which may be 250 ft. long instead of 450 ft. kilns as commonly used in wet process cement plants. The amount of heat per barrel of cement is also reduced to about 650,000 B.t.u. per barrel of cement instead of over 1,000,000 B.t.u. per barrel as commonly required in wet process plants.

The waste gases leaving blower 54a at a temperature of 300–500° F. still contain values which may be recovered in a condenser 53a or other recovery apparatus. The waste gases contain a large volume of steam which will transfer 970 B.t.u. per pound of steam to cooling water used in the condenser. The hot water may be used for plant heating or for process hot water. The gases also contain a large volume of carbon dioxide from the decomposition of the limestone and the burning of the fuel in the kiln. The $CO_2$ may be recovered by absorption or condensation to be sold in the form of liquid or as Dry Ice. It may also be used in the synthesis of carbon compounds. After leaving the condenser 53a, the waste gases pass through a pipe 55 to a stack 56 to discharge into the atmosphere.

The scrubbing action of the wet cement pulp falling through the upwardly rising stream of dust laden waste gases is useful by itself as a means of drying the pulp and precipitating dust from the gases to produce a pulp-dust mixture. If it is desired to remove the last traces of dust from the gases, said gases leaving the blower 54a may pass through a cyclone or electrical dust collector 57 before going to the stack 56. The dust collector is provided with a bottom chute 58 which discharges dust from dust collector 57 onto the inclined floor 39 to be picked up by the buckets.

Additional flights of conveyor chain and baffles may be provided in the chamber 10, if desired, to increase the time of exposure of the cement pulp to the hot gases. Also a conductor 60 may be provided from the pipe 42 through the top 43 of chamber 10 so that a regulated supply of wet pulp may be discharged into the hottest kiln gases in the chamber to suddenly reduce the temperature of the kiln gases so that they are less destructive to the buckets and other metal parts in the chamber 10. The conductor 60 may be a screw conveyor, air conveyor or other suitable conveyor. This introduction of wet pulp into the hot side of chamber 10 will reduce the temperature of the hot gases from 1800° F. to about 1400–1600° F., by sudden or explosive generation of steam from the moisture in the wet pulp and at no loss in efficiency. This suddenly dried and preheated pulp falls to the inclined chamber bottom 50 to be picked up by the buckets and carried through the process. The temperature in the hot side of chamber 10 can thus be accurately controlled at any desired point by regulating the flow of pulp through conductor 60.

I would state in conclusion that, while the examples illustrated constitute a practical embodiment of my invention, I do not wish to limit myself precisely to these details, since manifestly the same may be considerably varied without departing from the spirit of the invention as defined in the appended claims.

Having thus described my invention, I claim as new and desire to secure by Letters Patent:

1. In an apparatus of the class described, a chamber, a rotary cement kiln communicating with said chamber and arranged to discharge hot dust-laden gases into said chamber, means for introducing wet cement pulp into said chamber to dry said pulp and precipitate dust from said gases, said pulp mixing with said dust, a chain conveyor within said chamber moving in substantially vertical reaches along a tortuous path, a baffle within said chamber between certain reaches of said chain, pivoted buckets carried by said chains to carry said mixture along said tortuous path to be further dried, and means for discharging said dried mixture into said kiln for further heat treating.

2. In an apparatus of the class described, a chamber, a cement kiln communicating with said chamber and arranged to discharge hot gases into said chamber, a chain within said chamber arranged to travel in a tortuous path in substantially vertical reaches, a baffle within said chamber extending between adjacent reaches of said chain, pivoted buckets carried by said chain, means for introducing wet cement slurry pulp into said buckets to be dried by said gases, and means for discharging said dried pulp from said buckets into said kiln to be further heat treated.

3. In apparatus of the class described, the combination with means for removing excess liquid from a pulp to form a semi-solid material, of a chamber, a rotary kiln communicating with said chamber and supplying hot dust-laden gases thereto, means for feeding said material into said chamber to fall therethrough in an upwardly moving stream of hot gases supplied from said kiln, a flexible conveyor in said chamber having a lower run thereof moving across the floor of said chamber to pick up the partially dried dust-coated material and move said material through a tortuous path in said hot gases to complete the drying of said material, and means for discharging said dry material from said conveyor to said rotary kiln for further high temperature heating.

4. In an apparatus of the class described, the combination with means for removing excess liquid from a pulp to form a semi-solid material, of a chamber, a rotary kiln communicating with said chamber and supplying hot dust-laden gases thereto, means for feeding said material into said chamber to fall therethrough in an upwardly moving stream of hot gases supplied from said kiln, a flexible conveyor in said chamber having a lower run thereof moving across the floor of said chamber to pick up the partially dried dust-coated material and move said material through a tortuous path in said hot gases to complete the drying of said material, said conveyor having pivoted buckets for carrying said material, and means for tilting said buckets at a predetermined point to discharge said dry material from said buckets to said kiln for further high temperature heating, said kiln gases being adapted to precipitate dust into the bottom of said chamber to be collected by said buckets.

5. In a combination drier and dust collector for Portland cement kilns, means for filtering a cement slurry to remove excess water from said slurry to form a semi-solid pulp, a rotary kiln communicating with said chamber and supplying hot dust-laden gases thereto, means for feeding said pulp into said chamber to fall through an upwardly moving stream of hot gases within said chamber to precipitate dust from said gases and partly dry said pulp, a chain conveyor within said chamber having pivoted buckets for receiving pulp and dust mixture from the bottom of said chamber and moving said mixture through a tortuous path to dry said mixture, and means for tilting said buckets and discharging said mixture into said kiln for further heat treatment.

6. In an apparatus of the class described, the combination with means for removing excess liquid from a pulp to form a semi-solid material, a chamber for causing said material to fall downwardly through an upwardly moving stream of hot gases from a rotary kiln so as to partially dry said material, a rotary kiln communicating with said chamber and supplying hot dust-laden gases thereto, a flexible conveyor having pivoted buckets arranged to pick up said partly dry material and to move said material through a tortuous path in said hot gases to complete the drying of said material, a second conveyor arranged to deliver said wet material into said chamber into the hottest of said kiln gases to suddenly reduce the temperature of said gases and prevent damage to said first conveyor, and means for discharging said dry material from said buckets to said kiln for further high temperature heating.

7. In an apparatus of the class described, the combination with means for removing excess liquid from a pulp to form a semi-solid material, a chamber for causing said material to fall downwardly through an upwardly moving stream of hot gases from a rotary kiln so as to partially dry said material, a rotary kiln communicating with said chamber and supplying hot dust-laden gases thereto, a flexible conveyor having pivoted buckets arranged to pick up said partly dry material and to move said material through a tortuous path in said hot gases to complete the drying of said material, a second conveyor communicating with said chamber, means for delivering a cooling agent through said secondary conveyor to the hottest of said kiln gases to suddenly reduce the temperature of said gases and prevent damage to said first conveyor.

References Cited in the file of this patent

UNITED STATES PATENTS

| | | |
|---|---|---|
| 803,530 | Grondal | Oct. 31, 1905 |
| 1,369,840 | Roy | Mar. 1, 1921 |
| 1,489,846 | O'Connell et al. | Apr. 8, 1924 |
| 1,605,279 | Pike | Nov. 2, 1926 |
| 2,024,453 | Vogel-Jorgensen | Dec. 17, 1935 |